(12) United States Patent
Masaki (10) Patent No.: US 7,673,313 B2
(45) Date of Patent: Mar. 2, 2010

(54) PARENTAL CONTROL SYSTEM USING PROGRAM CONTENT SUBSTITUTION

(75) Inventor: Yasuo Masaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 983 days.

(21) Appl. No.: 11/315,849

(22) Filed: Dec. 21, 2005

(65) Prior Publication Data

US 2006/0136962 A1 Jun. 22, 2006

(30) Foreign Application Priority Data

Dec. 21, 2004 (JP) .............................. 2004-369955

(51) Int. Cl.
*H04N 7/16* (2006.01)
*H04N 7/10* (2006.01)

(52) U.S. Cl. .............................. 725/25; 725/32; 725/34

(58) Field of Classification Search ............. 725/25–29, 725/9, 46, 31
See application file for complete search history.

(56) References Cited

U.S. PATENT DOCUMENTS

| 5,164,992 | A | * | 11/1992 | Turk et al. ................... 382/118 |
| 5,400,402 | A | * | 3/1995 | Garfinkle ..................... 380/231 |
| 5,781,683 | A | * | 7/1998 | Sakoguchi et al. ............. 386/96 |
| 5,973,683 | A | * | 10/1999 | Cragun et al. ................ 715/719 |
| 7,134,130 | B1 | * | 11/2006 | Thomas ........................ 725/25 |
| 2002/0174430 | A1 | * | 11/2002 | Ellis et al. ..................... 725/46 |
| 2002/0199188 | A1 | * | 12/2002 | Sie et al. ........................ 725/35 |
| 2003/0115593 | A1 | * | 6/2003 | Alten et al. .................... 725/28 |
| 2004/0221303 | A1 | * | 11/2004 | Sie et al. ........................ 725/29 |
| 2006/0040248 | A1 | * | 2/2006 | Aaron ........................... 434/362 |

FOREIGN PATENT DOCUMENTS

| JP | 11-259930 | 9/1999 |
| JP | 2000-115725 | 4/2000 |
| JP | 2000-175117 | 6/2000 |
| JP | 2000-354209 | 12/2000 |
| JP | 2001-103387 | 4/2001 |
| JP | 2002-112218 | 4/2002 |

OTHER PUBLICATIONS

Patent Abstracts of Japan, Publication No. 2001-103387, Publication Date Apr. 13, 2001, 2 pages.

(Continued)

*Primary Examiner*—Lester Kincaid
*Assistant Examiner*—Yu (Andy) Gu
(74) *Attorney, Agent, or Firm*—Osha • Liang LLP (57) ABSTRACT

A broadcasting signal receiving system includes: an obtaining part for obtaining program information of a receiving program; a broadcasting signal receiving part for receiving a broadcasting signal; an image pick-up part for recording an image of a viewer; a certifying part for comparing the image of the face of the viewer recorded by the image pick-up part with the previously registered image of a face of an individual to certify the viewing individual; an image recording and reproducing part for recording and storing preset useful programs; a harmful program condition setting part for setting harmful program conditions; and a viewing limit control part, wherein when a certified result indicates an individual as an object whose viewing is limited and the receiving program corresponds to a set harmful program, the viewing limit control part reproduces and displays on a monitor screen the useful programs.

1 Claim, 6 Drawing Sheets

OTHER PUBLICATIONS

Patent Abstracts of Japan, Publication No. 2000-175117, Publication Date Jun. 23, 2000, 2 pages.

Japanese Office Action for Japanese Application No. 2004-369955, mailed on Jun. 27, 2007, with English translation thereof (7 pages).

* cited by examiner

| PROGRAM | NAME OF PROGRAM | PRIORITY OF VIEWING | RECORDING DATE (293) | REPRODUCTION/ NON-REPRODUCTION (294) |
|---|---|---|---|---|
| A | aaa | 1 | 7 O'CLOCK P.M. ON OCTOBER 30, 2004 | |
| B | bbb | 3 | | |
| C | ccc | 2 | | |
| D | ddd | 4 | | |
| ⋮ | ⋮ | ⋮ | ⋮ | ⋮ |

FIG. 2B

| PROGRAM | NAME OF PROGRAM |
|---|---|
| E | eee |
| F | fff |
| G | ggg |
| ⋮ | ⋮ |

PARENTAL CONTROL SYSTEM USING PROGRAM CONTENT SUBSTITUTION

BACKGROUND OF THE INVENTION

1. Field of the Invention

The present invention relates to a broadcasting signal receiving system, and more particularly to a broadcasting signal receiving system in which viewing programs are limited in accordance with a preset standard to view useful programs.

2. Description of the Related Art

In a broadcasting system such as ground wave broadcasting or a cable television, satellite broadcasting or the like, to limit the reception of video signals including violent scenes or sexual scenes, a V-chip system is proposed. In the V-chip system, data showing viewing limit levels is added respectively to programs to be broadcast. A device side receiving the programs presets levels at which the programs can be viewed to receive only the programs that satisfy the set levels.

On the other hand, a device is also proposed in which a user viewing the program is recognized by identifying a face by a camera or recognizing a fingerprint and an audio to automatically decide and perform whether or not the viewing is limited in accordance with the result (for instance, see JP-A-2000-175117). According to this device, the viewing is not uniformly limited only by setting levels and a viewer as an individual can be specified to individually limit the viewing.

Further, a device is also proposed in which when a channel selected when a power is turned on corresponds to a program a viewing of which is limited, other channel is automatically selected and displayed on a monitor screen (for instance, see JP-A-2001-103387). In this case, as other channels, channels favored by a viewer or corresponding to taste information can be set. That is, other channels the viewing of which is not limited during turning on the power can be selected in accordance with the taste of the viewer.

However, the device disclosed in the JP-A-2000-175117 merely puts emphasis on the limitation of the reception of video signals including and does not adequately consider a state after a viewing is limited. Therefore, a viewer himself or herself needs to perform an operation for switching a channel to other channels that can be viewed.

Further, in the device disclosed in the JP-A-2001-103387, even when the viewer himself or herself does not switch the channel to other channels, the channel can be automatically switched to other channel favored by the viewer or meeting the taste information. However, when the viewing of a channel is limited, the channel favored by the viewer is not necessarily included in other channels, so that the viewer must undesirably select a channel from channels located within a narrow range.

Such a viewing limit is a function provided mainly by taking infants or children into consideration. While parents desire to limit the reception of harmful programs including the violent scenes or the sexual scenes and they wish their children to positively view useful programs.

SUMMARY OF THE INVENTION

The present invention is devised by considering the above-described circumstances and it is an object of the present invention to provide a broadcasting signal receiving system in which children are limited to see harmful programs and controlled to view useful programs at a timing of limiting the viewing.

A broadcasting signal receiving system of the present invention includes: an obtaining part for obtaining program information of a receiving program; a broadcasting signal receiving part for receiving a broadcasting signal to obtain a video signal and an audio signal; an image pick-up part for recording an image of a viewer; a certifying part for comparing the image of the face of the viewer recorded by the image pick-up part with the previously registered image of a face of an individual to certify the viewing individual; an image recording and reproducing part for recording and storing preset useful programs; a harmful program condition setting part for setting harmful program conditions; and a viewing limit control part. When a certified result indicates an individual as an object whose viewing is limited and the receiving program corresponds to a set harmful program on the basis of the certified result by the certifying part, the contents of the receiving program based on the program information and the set harmful program conditions, the viewing limit control part reproduces and displays on a monitor screen the useful programs stored in the image recording and reproducing part. In this case, the harmful program conditions can be individually set by a parent in accordance with the names of the programs included in the program information obtained by the obtaining part.

According to the present invention, as a result of a certification by the certifying part, when the viewer whose image is recorded by the image pick-up part is a child and the receiving program corresponds to a harmful program individually set by the parent, the useful program previously recorded and stored in the image recording and reproducing part can be reproduced and displayed on the monitor screen. For instance, a program that the child tries to see is a harmful program (for instance, a vulgar animation program or a vulgar comical program, etc.), the program can be switched to a previously recorded useful program (for instance, a weekly child news, etc.) and the useful program can be displayed on the monitor screen. Thus, the children can be limited to see the harmful programs and can be controlled to see an educationally advantageous program. In this case, since the useful programs can be previously selected and stored in the image recording and reproducing part by the parent, the useful programs meeting the conditions of each home can be set.

Further, according to the present invention, a clock part for timing a current time; and a time zone setting part for setting a time zone for limiting a viewing are further included. When the certified result indicates an individual as an object whose viewing is limited and the receiving program corresponds to the set harmful program, if the current time is not located within a viewing limit time zone set to the time zone setting part, the viewing limit control part may not limit the viewing.

According to such a structure, for instance, when the parents work together for a living and are not present until 7 p.m. or so, the viewing limit time zone is set till 7 p.m. In the time zone after 7 p.m. when the parents can see the program together, a flexible action may be taken that a somewhat harmful program is permitted to see.

Further, according to the present invention, a priority setting part is further provided for setting a priority of viewing to the useful programs stored in the image recording and reproducing part. When a plurality of useful programs are stored in the image recording and reproducing part, the viewing limit control part may reproduce the useful programs in order of the higher priority set as described above. In accordance with such a structure, while the viewing of the harmful program is limited, the children can be permitted to see the useful programs in accordance with the priority set by the parent. When the broadcasting of the program that restrains the children from viewing is finished, if the useful program reproduced at that time is completely reproduced, the reproduction of the useful program may be also stopped to switch a channel so as to return to a channel selected during limiting the viewing and display the receiving program on the monitor screen.

In the above-described structure, the useful programs are reproduced in order of the set higher priority. However, the list of the useful programs stored in the image recording and reproducing part may be displayed on the monitor screen to reproduce a useful program selected from the list by the viewer. Thus, since the children can freely select a program that they desire to view from the useful programs, the intention of the children can be esteemed.

Still further, according to the present invention, elapse time information after recording the programs and information showing that the programs are reproduced or not reproduced are added to the useful programs stored in the image recording and reproducing part. When the useful program stored in the image recording and reproducing part is not reproduced yet and a preset and prescribed time elapses, if the certified result by the certifying part indicates an individual as an object whose viewing is limited, the viewing limit control part may limit the viewing of even the receiving program that is not the set harmful program and reproduce and display on the monitor screen the useful program. In accordance with such a structure, for instance, when the child records the weekly child news, and then, he or she does not reproduce it once even after five days pass, if the child turns on a television, he or she can be made to see the weekly child news whether or no the channel broadcasts a harmful program.

According to the present invention, as a result of a certification by the certifying part, when the viewer whose image is recorded by the image pick-up part is a child and the receiving program corresponds to a harmful program, the useful program previously recorded and stored in the image recording and reproducing part can be reproduced and displayed on the monitor screen. Thus, even when a protector is not present, the children can be limited to see the harmful programs and can be controlled to see educationally advantageous programs. In this case, since the useful programs can be previously selected and stored in the image recording and reproducing part by the parent, the useful programs meeting the conditions of each home can be set.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, embodiments of the present invention will be described below by referring to the drawings.

Figure 1:
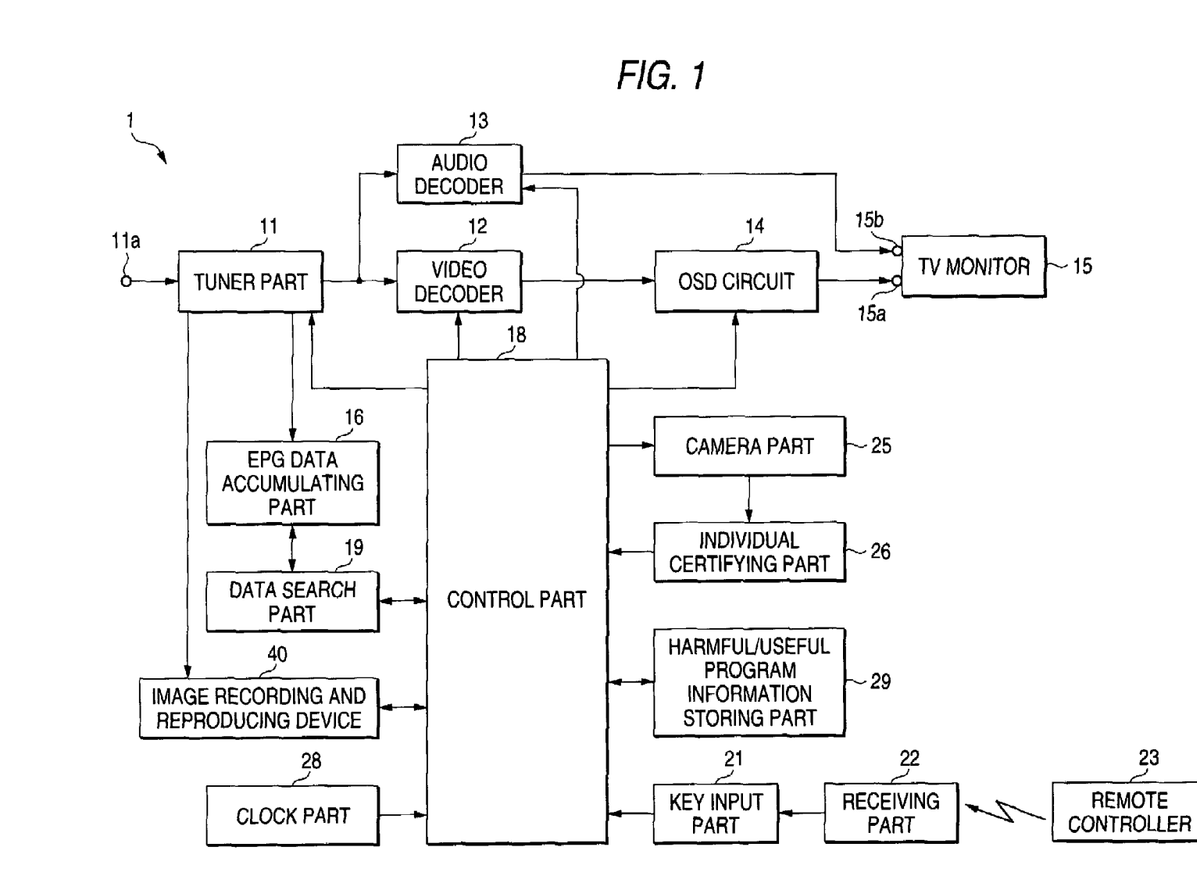
FIG. 1 is a functional block diagram showing the entire structure of a broadcasting signal receiving system of the present invention.

FIG. 1 is a functional block diagram showing the entire structure of a broadcasting signal receiving system of the present invention.

A broadcasting signal receiving system 1 includes an input terminal 11a for inputting a broadcasting signal received by an antenna not shown in the drawing and a tuner part 11 is connected to the input terminal 11a. An output of the tuner part 11 is connected to a video decoder 12 for converting a digital video signal to an analog video signal and connected to an audio decoder 13 for converting a digital audio signal to an analog audio signal. Further, the output of the video decoder 12 is connected to a video input terminal 15a of a TV monitor 15 through an OSD (on screen display) circuit 14. Further, the output of the audio decoder 13 is connected to an audio input terminal 15b of the TV monitor 15.

Further, a received broadcasting signal in the output of the tuner part 11 is connected to an image recording and reproducing device 40 such as a hard disk recorder or a DVD recorder. The image recording and reproducing device 40 is connected to a below-described control part 18.

The output of the tuner part 11 is connected to an EPG data accumulating part (RAM or EEPROM) 16 for temporarily accumulating the latest electronic program guide (EPG) data included in the received broadcasting signal.

A control part 18 is composed of a CPU, a ROM, a RAM or the like whose illustrations are omitted and controls the tuner part 11, the video decoder 12, the audio decoder 13 and the OSD circuit 14, respectively. Further, to the control part 18, a data search part 19 for searching the EPG data accumulated in the EPG data accumulating part 16 is bi-directionally connected. The control part 18 controls the data search part 19 at a suitable timing to search the EPG data accumulated in the EPG data accumulating part 16.

Further, to the control part 18, a key input part 21 is connected for inputting various kinds of key operating signals to the control part 18. To the key input part 21, an output of a receiving part 22 is connected for receiving a key operating signal from a remote controller 23. That is, the key input part 21 not only inputs the operating signals of various kinds of keys (buttons) provided on a front surface panel of a device main body to the control part 18, but also inputs the key operating signal from the remote controller 23 received by the receiving part 22 to the control part 18. Further, to the control part 18, a clock part 28 for timing a present time is connected.

In the device main body, a camera part (CCD camera part) 25 as an image pick-up part for shooting a viewer is provided. The output of the camera part 25 is connected to an individual certifying part 26 for certifying an individual on the basis of a shot image. A certified result in the individual certifying part 26 is inputted to the control part 18.

Further, to the control part 18, a harmful/useful program information storing part 29 for storing various kinds of information of harmful programs or useful programs set by a user (here, a parent as a protector of children) is connected.

In the above-described structure, in the individual certifying part 26, information showing the physical features (in this embodiment, the features of faces) of all the members of a family (only the information of infants or children may be stored) is previously stored in an inner memory not shown in the drawing. As a storing method of the information, for instance, a menu button of the remote controller 23 not shown is operated to select a register mode of recognizing information. The register mode of the recognizing information means a mode for previously storing in the memory part the feature information of an object to be shot that is recognized by the individual certifying part 26.

Specifically explained, for instance, when the recognizing data of a child is formed, the face of the child is shot with a designated distance spaced from the camera part 25. The individual certifying part 26 forms child recognizing data on the basis of the shot image of the face. Since an image recognizing technique is usually known, a detailed description thereof is omitted herein. The child recognizing data (feature data) is stored in the inner memory. The individual certifying part 26 subsequently certifies a specific individual on the basis of the certifying data stored in the inner memory.

Figure 2A:
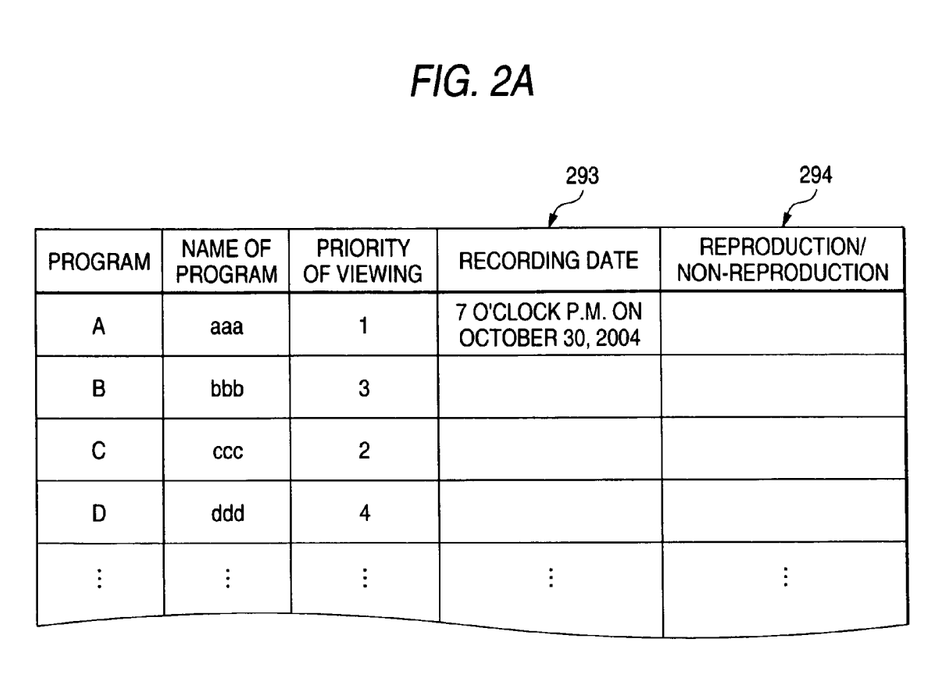
FIG. 2A shows a structural example of useful program information data stored in a harmful/useful program information storing part.

FIG. 2A shows a data structural example of the useful program information stored in the harmful/useful program information storing part 29.

The useful program information includes four information having the name of a program corresponding to the contents of the program, a priority of viewing, an image recording date and a reproduction/non-reproduction. The name of the program and the priority of viewing of them are inputted from the remote controller 23 by the protector. Further, the image recording date and the reproduction/non-reproduction are automatically inputted by the control part 18. In this example, the names of programs aaa to ddd respectively corresponding to four programs A to D are registered as the useful programs by the protector. The program A is set to a priority 1, the program C is set to a priority 2, the program B is set to a priority 3 and the program D is set to a priority 4. When the useful programs A to D are recorded, the recorded dates thereof are automatically registered in a column 293 of the recording date. Accordingly, whether or not the recording date is registered in the column 293 of the recording date is recognized so that whether or not the program is actually recorded can be recognized. The recording date is recognized so that an elapse time after the program is recorded can be calculated.

For instance, assuming that it is now at 7 o'clock p.m. on Oct. 30, 2004, since the program A with the name of the program of aaa is recorded at 7 o'clock p.m. on Oct. 24, 2004 (precisely, an image record is started), it is understood that 6 days pass after the program A is recorded (precisely, the image record is started). Further, when the recorded useful program is reproduced, "reproduced" is registered in a column 294 of the reproduction/non-reproduction shown in FIG. 2A. Accordingly, the column 294 of the reproduction/non-reproduction is recognized so that whether or not the recorded program has been already reproduced can be recognized. In this connection, in the example shown in FIG. 2A, any of the programs are not reproduced.

Further, it is assumed that these useful programs are broadcast once a week. The image recording and reproducing part 40 updates and records the programs every week. The programs do not necessarily need to be updated and recorded and may be stored in the image recording and reproducing part 40 as long as the protector himself or herself erases the programs. The useful programs are not limited to programs broadcast once a week and may be regularly or irregularly broadcast.

Figure 2B:
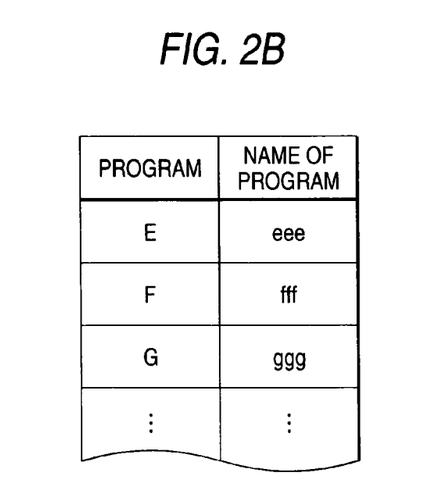
FIG. 2B shows examples of harmful programs stored in the harmful/useful program information storing part.

FIG. 2B shows one example of the harmful program information stored in the harmful/useful program information storing part 29. In this example, as the harmful programs, three programs E to G including the name of a program eee, the name of a program fff and the name of a program ggg are registered by the protector.

When the certified result indicates an individual as an object whose viewing is limited and a receiving program corresponds the set harmful program on the basis of the certified result by the individual certifying part 26, the contents of the receiving program (for instance, the name of a program) based on the EPG data accumulated in the EPG data accumulating part 16 and the harmful program information stored in the harmful/useful program information storing part 29, the control part 18 carries out a viewing limit control to reproduce and display on the screen of the TV monitor 15 the useful programs stored in the image recording and reproducing part 40.

Embodiments of the viewing limit control by the control part 18 will be specifically described below.

Figure 3:
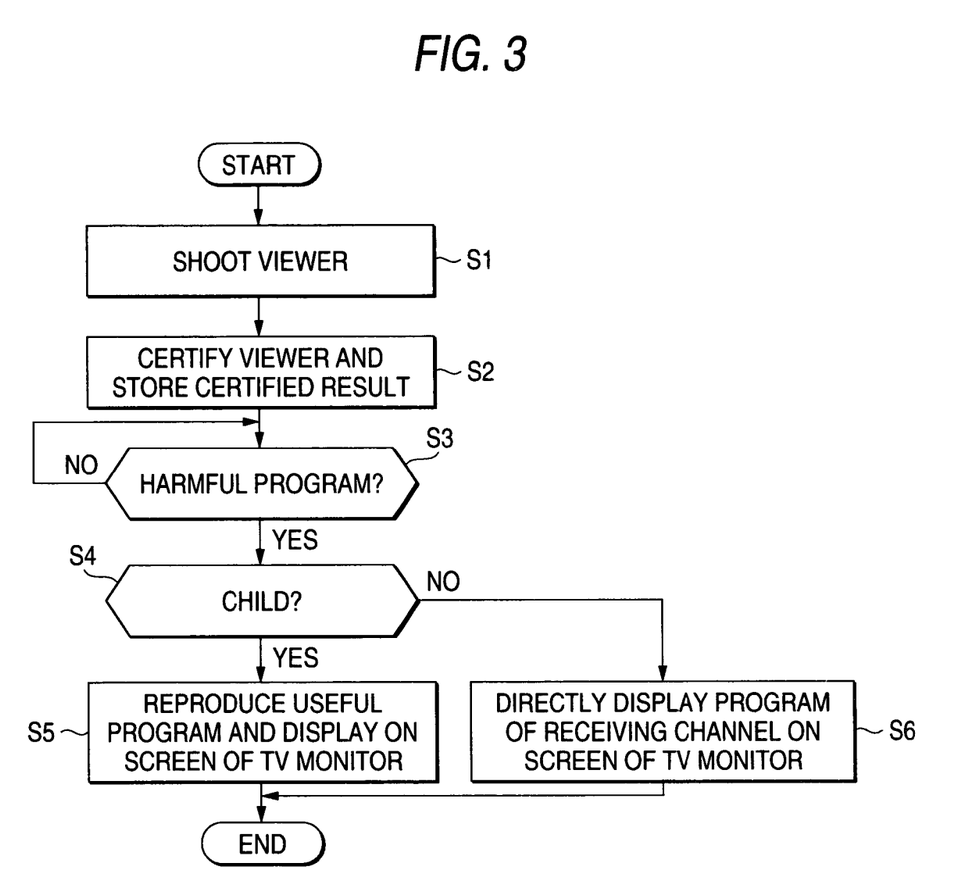
FIG. 3 is a flowchart showing a viewing limit control process according to a first embodiment of the broadcasting signal receiving system of the present invention.

FIG. 3 is a flowchart showing a viewing limit control process of a first embodiment. Now, referring to this flowchart, the procedure of the viewing limit control of the first embodiment will be described below.

For instance, when a power of a television is turned on by the remote controller 23, the control part 18 controls the camera part 25 to shoot a viewer (step S1). The individual certifying part 26 compares the image of the face of the viewer shot by the camera part 25 with the image of the face of the child previously registered in the inner memory to certify the viewer and store the certified result in the inner memory not shown in the drawing (step S2).

Under this state, the control part 18 searches the EPG data accumulating part 16 by the data search part 19 to decide whether or not a currently received broadcasting program is the harmful program stored in the harmful/useful program information storing part 29 (step S3). This decision is carried out, for instance, when a channel is selected or switched by the remote controller 23. As a result, when the currently received broadcasting program is the set harmful program (for instance, when the program is the program E with the name of the program of eee shown in FIG. 2B), then, the certified result stored in the inner memory is referred to decide whether or not the certified viewer is a child (step S4). As a result, when the viewer is not the child (when it is decided to be No in the step S4), an operation is moved to step S6. Thus, the viewing limit is not performed and the program of the receiving channel is displayed on the screen of the TV monitor 15 as it is.

On the other hand, when the viewer is the child (when it is decided to be Yes in the step S4), then, the viewing of the program of the receiving channel is limited and the useful program stored in the image recording and reproducing part 40 is reproduced and displayed on the screen of the TV monitor 15 (step S5).

Here, the useful program is reproduced. In this case, as shown in FIG. 2A, when a plurality of useful programs are stored and the priority of viewing is set to these programs, the useful programs are reproduced in order of the higher priority of viewing. Specifically, firstly, the program A of the priority 1 of viewing is reproduced. When the reproduction of the program A is completed, then, the program C of the priority 2 of viewing is reproduced. When the reproduction of the program C is completed, then, the program B of the priority 3 of viewing is reproduced. When the program B is completely reproduced, then, the program D of the priority 4 of viewing is reproduced.

In this case, while the programs A, C, B and D are reproduced in order, the broadcasting of the program E the viewing of which is restricted is finished. Then, when the reproduction of the program that is being reproduced is completed at that time, the reproducing operation of the image recording and reproducing part 40 is stopped to display the broadcasting program of a selected channel on the screen of the TV monitor 15. That is, a receiving state is switched to an ordinary receiving state.

In this connection, when the harmful program (for instance, the program E) the viewing of which is restricted and the useful program A having the priority 1 of viewing are broadcast for the same broadcasting time (for instance, 30 minutes), the program A is reproduced in place of receiving the program E. When the reproduction of the program A is finished, the receiving state is returned to the ordinary receiving state. Further, when the harmful program (for instance, the program F) the viewing of which is restricted is broadcast for one hour and the useful programs stored in the harmful/useful program information storing part 29 include, for instance, only the program B for 30 minutes, the program B may be repeatedly (in this case, two times) reproduced until the broadcasting of the harmful program F is finished.

In the first embodiment, when the viewing of the harmful program is limited, the useful programs stored in the image recording and reproducing part 40 are reproduced and displayed on the screen of the TV monitor in order of the higher priority. As compared therewith, in a second embodiment, the useful programs to be reproduced can be freely selected by a child.

Figure 4:
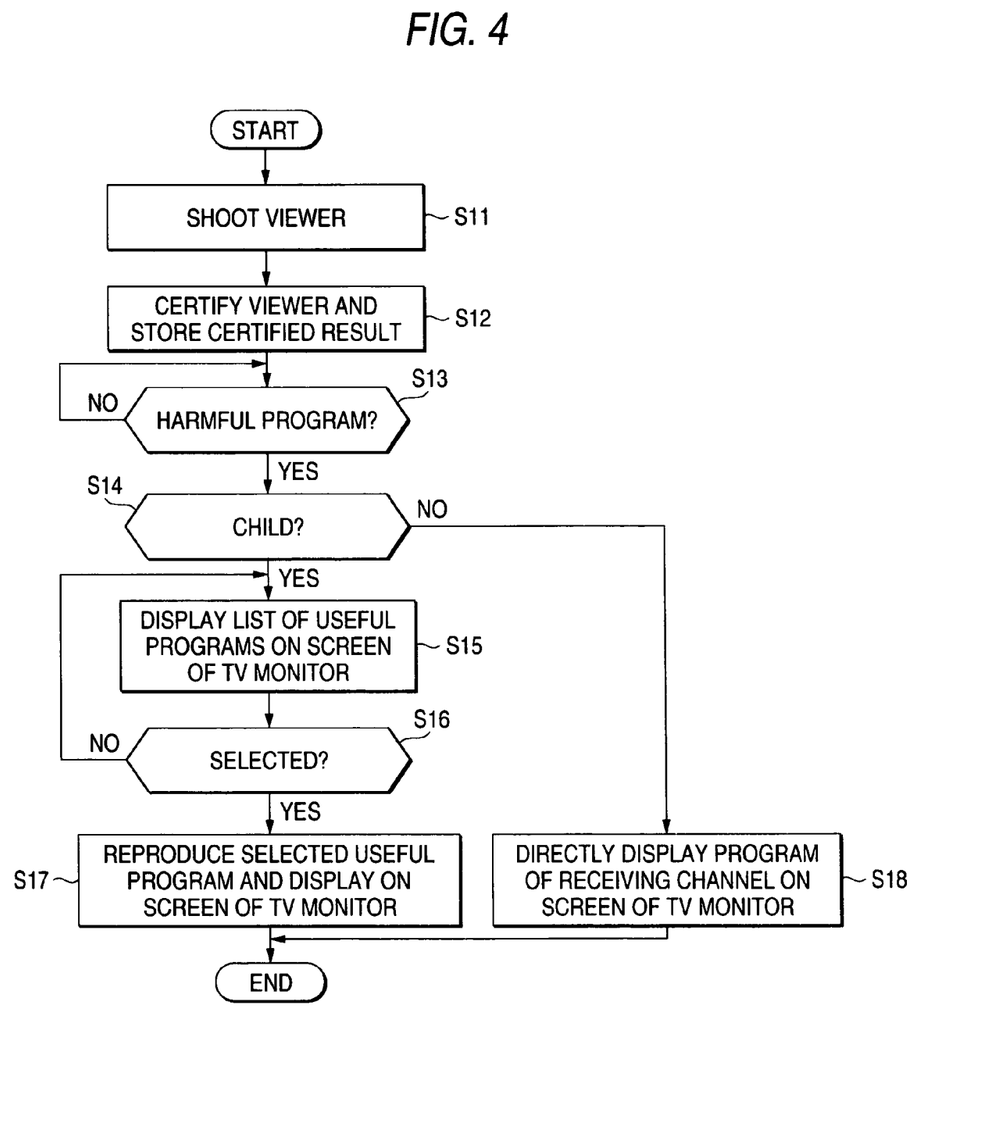
FIG. 4 is a flowchart showing a viewing limit control process according to a second embodiment of the broadcasting signal receiving system of the present invention.

FIG. 4 is a flowchart showing a viewing limit control process of the second embodiment. Now, referring to this flowchart, the procedure of the viewing limit control of the second embodiment will be described below.

For instance, when a power of a television is turned on by the remote controller 23, the control part 18 controls the camera part 25 to shoot a viewer (step S11). The individual certifying part 26 compares the image of the face of the viewer shot by the camera part 25 with the image of the face of the child previously registered in the inner memory to certify the viewer and store the certified result in the inner memory not shown in the drawing (step S12).

Under this state, the control part 18 searches the EPG data accumulating part 16 by the data search part 19 to decide whether or not a currently received broadcasting program is the harmful program stored in the harmful/useful program information storing part 29 (step S13). This decision is carried out, for instance, when a channel is selected or switched by the remote controller 23. As a result, when the currently received broadcasting program is the set harmful program (for instance, when the program is the program E with the name of the program of eee shown in FIG. 2B), then, the certified result stored in the inner memory is referred to decide whether or not the certified viewer is a child (step S14). As a result, when the viewer is not the child (when it is decided to be No in the step S14), an operation is moved to step S18. Thus, the viewing limit is not performed and the program of the receiving channel is directly displayed on the screen of the TV monitor 15.

On the other hand, when the viewer is the child (when it is decided to be Yes in the step S14), then, the viewing of the program of the receiving channel is limited and the list of the useful programs stored in the harmful/useful program information storing part 29 is displayed on the screen of the TV monitor 15 (step S15) to monitor whether or not an arbitrary useful program is selected from the list (step S16). Here, when the child selects one useful program (for instance, the program B) from the displayed list of the useful programs (it is decided to be Yes in the step S16), the control part 18 reproduces the selected useful program (the program B) stored in the image recording and reproducing part 40 and displays the program on the screen of the TV monitor 15 (step S17). That is, in the second embodiment, even when the priority of viewing is set, the priority of viewing is treated as invalidity.

In the above-described first and second embodiments, the viewing of the harmful programs is necessarily limited. However, in a third embodiment, the harmful program is permitted to see depending on a time zone. That is, in the third embodiment, a time zone for restricting a viewing can be set. Here, the time zone for limiting the viewing can be set, for instance, by operating the remote controller 23 by a protector. The information of the time zone set for limiting the viewing can be stored in, for instance, an arbitrary area of the harmful/useful program information storing part 29. For instance, when parents work together for a living and are absent till about 7 o'clock p.m., a time zone from about 3 p.m. when the child comes back home from a school to about 7 p.m. may be set as the time zone for limiting the viewing.

Figure 5:
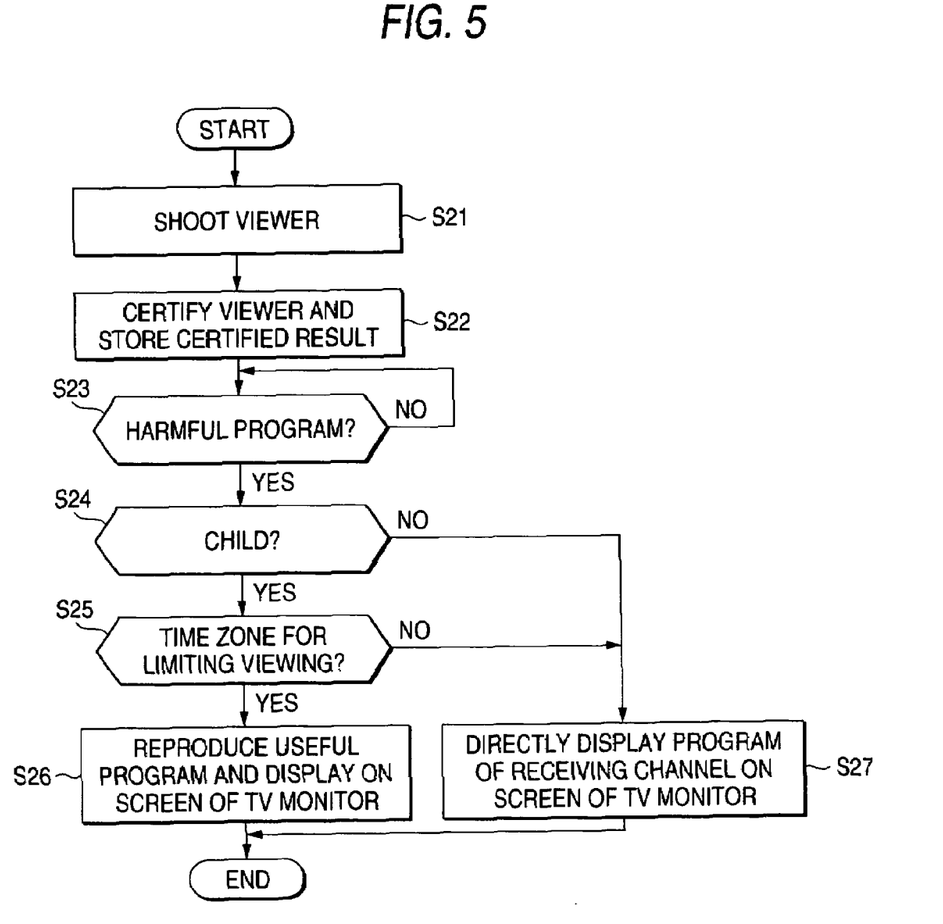
FIG. 5 is a flowchart showing a viewing limit control process according to a third embodiment of the broadcasting signal receiving system of the present invention.

FIG. 5 is a flowchart showing a viewing limit control process of a third embodiment. Now, referring to this flowchart, the procedure of the viewing limit control of the third embodiment will be described below.

For instance, when a power of a television is turned on by the remote controller 23, the control part 18 controls the camera part 25 to shoot a viewer (step S21). The individual certifying part 26 compares the image of the face of the viewer shot by the camera part 25 with the image of the face of the child previously registered in the inner memory to certify the viewer and store the certified result in the inner memory not shown in the drawing (step S22).

Under this state, the control part 18 searches the EPG data accumulating part 16 by the data search part 19 to decide whether or not a currently received broadcasting program is the harmful program stored in the harmful/useful program information storing part 29 (step S23). This decision is carried out, for instance, when a channel is selected or switched by the remote controller 23. As a result, when the currently received broadcasting program is the set harmful program (for instance, when the program is the program E with the name of the program of eee shown in FIG. 2B), then, the certified result stored in the inner memory is referred to decide whether or not the certified viewer is a child (step S24). As a result, when the viewer is not the child (when it is decided to be No in the step S24), an operation is moved to step S27. Thus, the viewing limit is not performed and the program of the receiving channel is directly displayed on the screen of the TV monitor 15.

On the other hand, when the viewer is the child (when it is decided to be Yes in the step S24), then, a present time is recognized by the clock part 28 to decide whether or not the present time is located within a preset time zone for limiting a viewing (step S25). As a result, when the present time is located within the time zone for limiting the viewing (when it is decided to be Yes in the step S25), the viewing of the program of a receiving channel (the harmful program E) is restricted to reproduce and display the useful program stored in the image recording and reproducing part 40 on the screen of the TV monitor 15 (step S26). The reproduction of the useful program at this time may be controlled depending on the priority of viewing as in the first embodiment or by a selection from the display of the list as in the second embodiment.

On the other hand, when the present time is located outside the time zone for limiting the viewing (when it is decided to be No in the step S25), an operation is moved to the step S27.

Then, the viewing limit is not carried out to directly display the program of the receiving channel on the screen of the TV monitor 15.

In the above-described first to third embodiments, only when the program of the receiving channel is the harmful program, the viewer is made to see the useful programs. However, in a fourth embodiment, whether or no the program of a receiving channel is the harmful program, when prescribed conditions are satisfied, a child is allowed to see a useful program.

Figure 6:
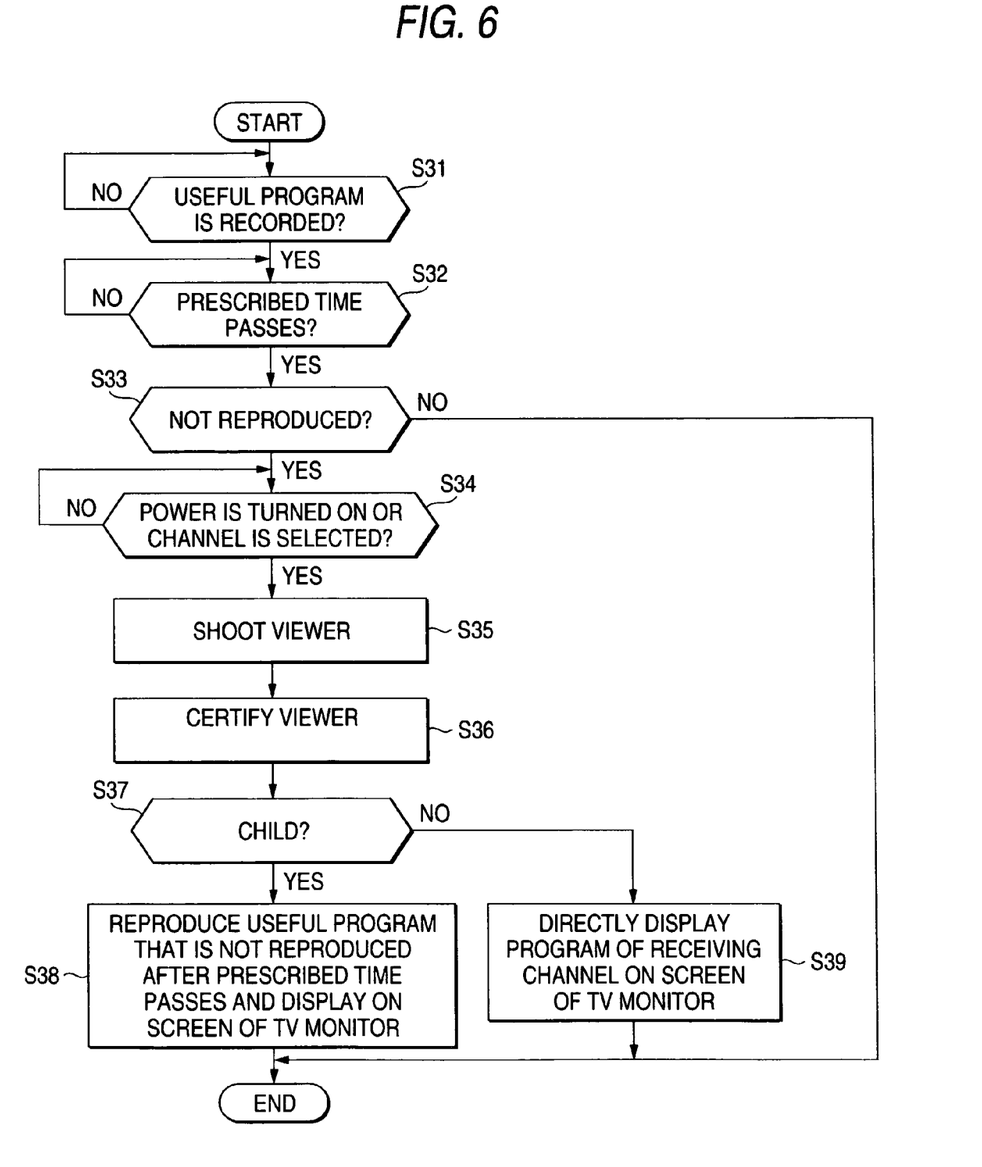
FIG. 6 is a flowchart showing a viewing limit control process according to a fourth embodiment of the broadcasting signal receiving system of the present invention.

FIG. 6 is a flowchart showing a viewing limit control process of a fourth embodiment. Now, referring to this flowchart, the procedure of the viewing limit control of the fourth embodiment will be described below.

The control part 18 monitors whether or not the useful program is recorded in the image recording and reproducing part 40 (step S31). When the useful program is recorded, the control part 18 monitors whether or not a preset and prescribed time (for instance, 5 days) elapses after the useful program is recorded (step S32). Whether or not the prescribed time elapses can be recognized in accordance with a calculation based on the recording date in the useful program information data stored in the harmful/useful program information storing part 29 and the present time of the clock part 28. As a result, when the prescribed time elapses (when it is decided to be Yes in the step S32), whether the useful program is not reproduced yet is recognized (step S33). Then, when the useful program is not yet reproduced and the preset and prescribed time passes (when it is decided to be Yes in the step S33), it is monitored whether or not a power of a television not shown is turned on by the remote controller 23 or whether or not an operation for selecting (switching) a channel is carried out after the power is turned on (step S34). When the power is turned on or the channel is selected (when it is decided to be Yes in the step S34), the camera part 25 is controlled to shoot a viewer (step S35).

The individual certifying part 26 compares the image of the face of the viewer shot by the camera part 25 with the image of the face of the child previously registered in the inner memory to certify the viewer (step S36) and decide whether or not the certified viewer is the child (step S37). As a result, when the viewer is not the child (when it is decided to be No in the step S37), an operation is moved to step S39 to directly display the program of a receiving channel on the screen of the TV monitor 15.

On the other hand, when the viewer is the child (when it is decided to be Yes in the step S37), the useful program that is stored in the image recording and reproducing part 40 and is not reproduced yet after the prescribed time passes (for instance, the useful program A shown in FIG. 2A) is reproduced and displayed on the screen of the TV monitor 15 (step S38).

Such a viewing limit control process is performed. Thus, when the child records the useful program A, for instance, the weekly child news and does not reproduce the program once even after 5 days pass, if the child turns on the television, the child can be made to see the weekly child news as the useful program, whether or no the channel shows the harmful program.

What is claimed is:

1. A broadcasting signal receiving system comprising:
    an obtaining part for obtaining program information of a receiving program;
    a broadcasting signal receiving part for receiving a broadcasting signal to obtain a video signal and an audio signal;
    an image pick-up part for recording an image of a viewer;
    a certifying part for comparing the image of the face of the viewer recorded by the image pick-up part with the previously registered image of a face of an individual to certify the viewing individual;
    an image recording and reproducing part for recording and storing preset useful programs;
    a harmful program condition setting part for setting harmful program conditions; and
    a viewing limit control part, wherein when a certified result indicates an individual as an object whose viewing is limited and the receiving program corresponds to a set harmful program on the basis of the certified result by the certifying part, the contents of the receiving program based on the program information and the set harmful program conditions, the viewing limit control part reproduces and displays on a monitor screen the useful programs stored in the image recording and reproducing part,
    wherein elapse time information after recording the programs and information showing that the programs are reproduced or not reproduced are added to the useful programs stored in the image recording and reproducing part, and when the useful program stored in the image recording and reproducing part is not reproduced yet and a preset and prescribed time elapses, if the certified result by the certifying part indicates an individual as an object whose viewing is limited, the viewing limit control part limits the viewing of even the receiving program that is not the set harmful program and reproduces and displays on the monitor screen the useful program.

* * * * *